US008847611B2

(12) United States Patent
Ulmen et al.

(10) Patent No.: US 8,847,611 B2
(45) Date of Patent: Sep. 30, 2014

(54) CAPACITIVE DIFFERENTIAL QUADRATURE ROTARY POSITION SENSOR

(71) Applicant: The Board of Trustees of the Leland Stanford Junior University, Palo Alto, CA (US)

(72) Inventors: John V Ulmen, Redwood City, CA (US); Barrett E. Heyneman, Redwood City, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 140 days.

(21) Appl. No.: 13/628,629

(22) Filed: Sep. 27, 2012

(65) Prior Publication Data

US 2013/0093439 A1 Apr. 18, 2013

Related U.S. Application Data

(60) Provisional application No. 61/627,786, filed on Oct. 18, 2011.

(51) Int. Cl.
*G01R 27/26* (2006.01)
*G05B 1/06* (2006.01)
*G01B 7/30* (2006.01)
*G08C 19/38* (2006.01)
*G01D 5/241* (2006.01)

(52) U.S. Cl.
CPC .................................. *G01D 5/2415* (2013.01)
USPC ............ 324/681; 324/686; 324/690; 318/662

(58) Field of Classification Search
CPC ..... G01D 5/2415; G01D 5/2412; G01B 7/30; G01B 7/003; G08C 19/38
USPC ........... 324/681, 686, 660, 690, 725; 318/662
See application file for complete search history.

(56) References Cited

U.S. PATENT DOCUMENTS

| | | | |
|---|---|---|---|
| 5,736,865 A | 4/1998 | Nelson et al. | |
| 6,118,283 A | * 9/2000 | Cripe | ............................ 324/660 |
| 7,864,075 B2 | 1/2011 | Gondo | |

\* cited by examiner

*Primary Examiner* — Melissa Koval
*Assistant Examiner* — Farhana Hoque
(74) *Attorney, Agent, or Firm* — Lumen Patent Firm

(57) ABSTRACT

A rotary position sensor is provided that includes a sensing disc having an N-fold rotation symmetry and capacitive sensing pads arranged in an array pattern, where the array pattern has at least 4N-fold rotation symmetry, where N≥2, a scale disc disposed opposite the sensing disc, where the scale disc includes a pattern of conductive pads that have a sinusoidal-shape, where the pattern of sinusoidal-shaped conductive pads produce four sinusoidal capacitance waveforms in quadrature phase with the capacitive sensing pads as the sensing disc and the scale disc are rotated relative to one another to provide angular position information. to provide angular position information. This is achieved by making the overlapping area of the of the capacitive sensing pads change in a sinusoidal fashion with rotation.

5 Claims, 4 Drawing Sheets $$\theta = \frac{1}{4}\operatorname{atan}2\left(\frac{C_1 - C_3}{C_2 - C_4}\right) + \theta_{\text{offset}}$$

FIG. 4(a)  FIG. 4(b)

CAPACITIVE DIFFERENTIAL QUADRATURE ROTARY POSITION SENSOR

CROSS-REFERENCE TO RELATED APPLICATIONS

This application claims priority from U.S. Provisional Patent Application 61/627,786 filed Oct. 18, 2011, which is incorporated herein by reference.

STATEMENT OF GOVERNMENT SPONSORED SUPPORT

This invention was made with Government support under contract W91CRB-10-C-0139 awarded by Defense Advanced Research Projects Agency. The Government has certain rights in this invention.

FIELD OF THE INVENTION

The current invention relates to rotation sensors. More particularly, the invention relates to a capacitive angular position sensor.

BACKGROUND OF THE INVENTION

It is often desirable to sense the angular position of a rotating part. Numerous kinds of rotation sensors have been developed over the years. One type of rotation sensor is a capacitive sensor, where a capacitance varies according to angular position. Rotary sensors known in the art are lacking in resolution and generally have an oversized form factor, making them impractical for applications requiring maximum signal production for a limited sensing area, in addition to having differential cancellation of offset bias and gain terms to reject noise caused by motion not in the direction of rotation the sensor.

What is needed is a rotary position sensor with high resolution and a reduced form factor that is able to operate for long periods of time, while having a reduced cost of fabrication.

SUMMARY OF THE INVENTION

To address the needs in the art, a rotary position sensor is provided that includes a sensing disc having an N-fold rotation symmetry and capacitive sensing pads arranged in an array pattern, where the array pattern has at least 4N-fold rotation symmetry, where $N \geq 2$, a scale disc disposed opposite the sensing disc, where the scale disc includes a pattern of conductive pads that have a shape, where the pattern of shaped conductive pads produce four sinusoidal capacitance waveforms in quadrature phase with the capacitive sensing pads as the sensing disc and the scale disc are rotated relative to one another to provide angular position information. This is achieved by making the overlapping area of the of the capacitive sensing pads change in a sinusoidal fashion with rotation.

According to one aspect of the invention, the conductive pads are electrically passive or electrically active.

In another aspect of the invention, the conductive pads have a ground connection and an active shield connection, where the ground connection provides a relatively maximum capacitive coupling to the sensing disc, and the active shield coupling provides a relatively minimum capacitive coupling to the sensing disc. In one aspect, the connections can have a physical connection of the scale disc conductors to the ground and the active shield terminals of capacitive sensing electronics, and/or a capacitive coupling to provide free rotation of the scale disc.

In a further aspect of the invention, a relative angular position of the sensing disc to the scale disc is deduced by subtracting each pair of the sinusoids that are 180 degrees out of phase and determining the four quadrant inverse tangents of a quotient of the two differences.

BRIEF DESCRIPTION OF THE DRAWINGS

FIGS. 4a-4c shows schematic drawings and a prototype of one embodiment of the invention.

DETAILED DESCRIPTION

Figure 1A:
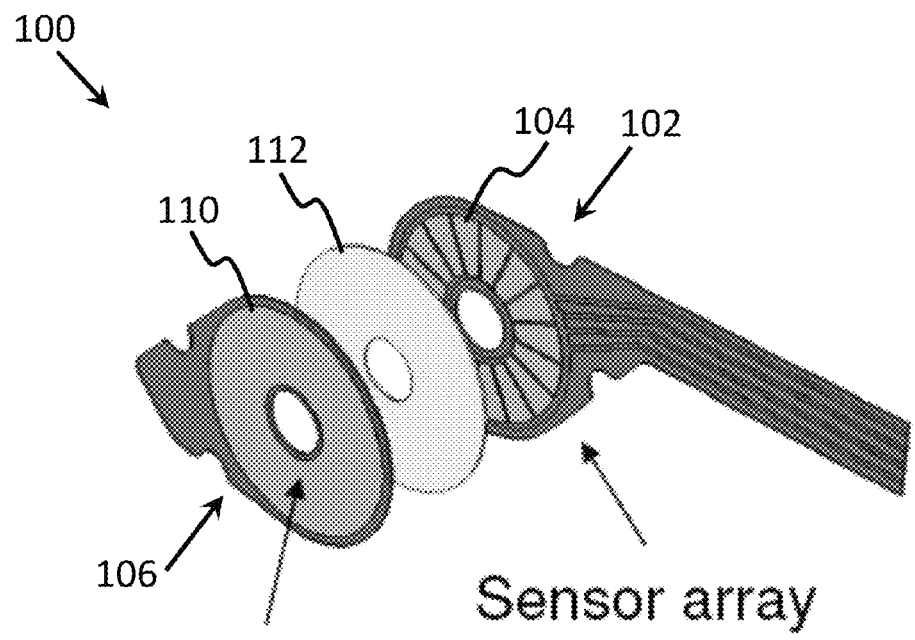
FIGS. 1a-1b show perspective exploded front and back views of one embodiment of the invention.
Figure 1B:
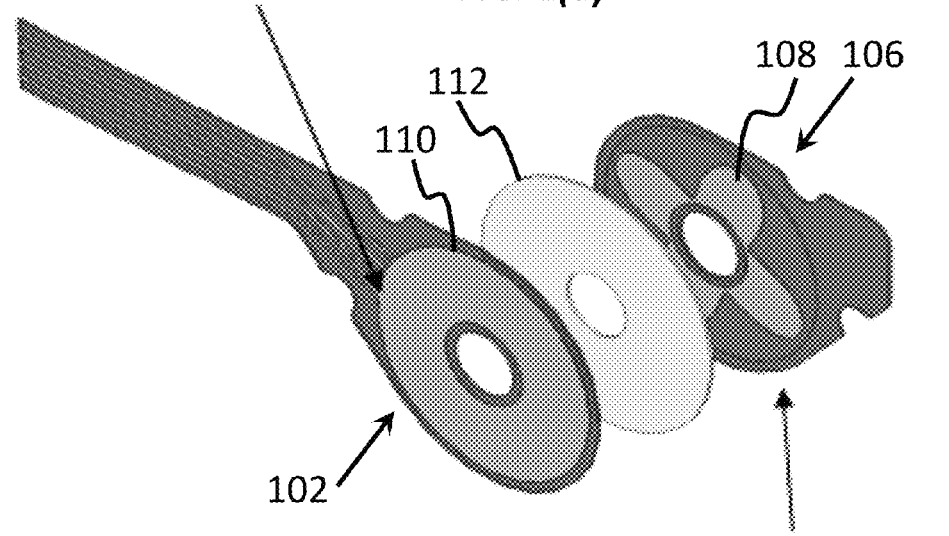
Figure 2A:
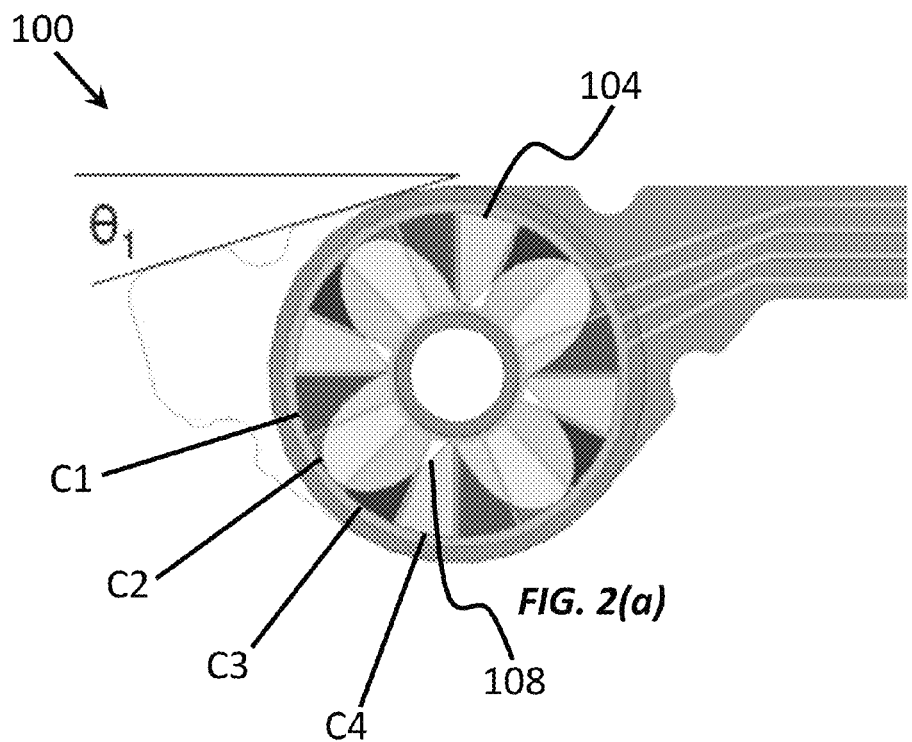
FIGS. 2a-2b show schematic drawings of the relationship of the patterns of the conductive pads on the scale disc and on the sense disc, according to one embodiment of the invention.
Figure 2B:
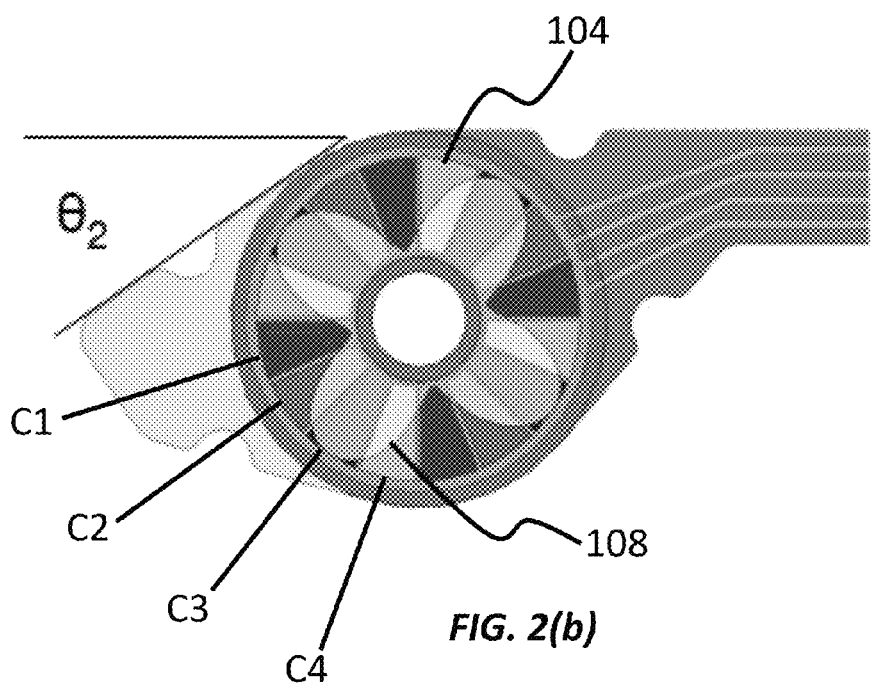

The present work provides an improved capacitive angular position sensor. FIGS. 1a-1b and FIGS. 2a-2b show different views of capacitive angular position sensor 100, according to one embodiment of the invention. Here, two flat discs are patterned with conductive material and laid over one another creating capacitive coupling between the two discs at the conductor locations. One disc, referred to as the sensing disc 102, has 4 capacitive sensing pads 104 labeled C1, C2, C3 and C4, that appear in at least 8 locations (at least 2 locations each) in a regular pattern around the surface of the sensing disc 102. In general, each capacitive sensing pad 104 has N-fold rotational symmetry ($N \geq 2$), and the overall pattern formed by all capacitive sensing pads 104 has 4N-fold rotational symmetry. The other disc, which will be referred to as the scale 106, has a pattern of rounded conductive pads 108 on its surface that produces four sinusoidal waveforms in capacitance, each 90 degrees out of phase with the previous, with the capacitive sensing pads 104 of the sensing disc 102 as the two discs are rotated relative to one another to provide angular position information. This is achieved by making the overlapping area of the capacitive sensing pads change in a sinusoidal fashion with rotation. Thus, the conductive pattern 108 on the scale 106 and the capacitive sensing pads 104 on the sensing disc 102 form the two plates of the capacitors, and the capacitances of these capacitors provide angular position information.

The pattern of rounded conductor pads 108 on the scale disc 106 utilizes two electrical connections: one to ground and one to an active shield 110 on the opposite side of the scale disc 106 that produce maximum capacitive coupling and minimum capacitive coupling to the sensing disc 102 respectively. The electrical connection can be made by physical connection of the rounded conductive pads 108 of the scale disc 106 to the ground and active shield terminals of capacitive sensing electronics or can be made by capacitive coupling to these connections to allow free rotation of the scale 106. A combination of wired connection and capacitive coupling may also be used.

Figures 3A, 3B:
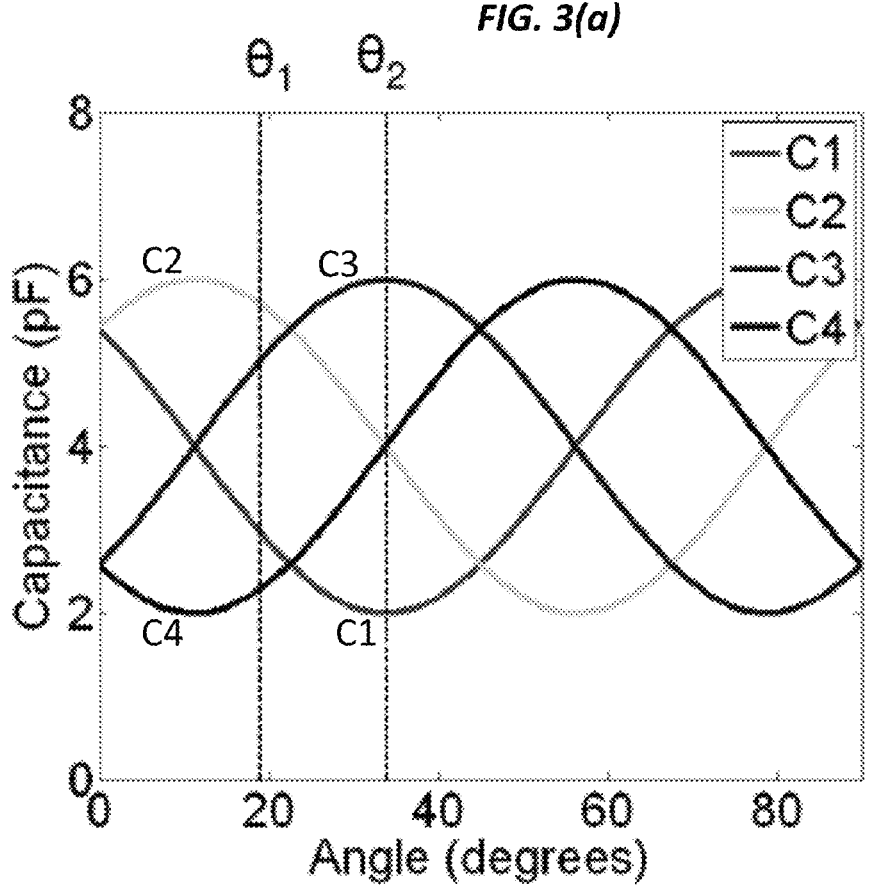
FIGS. 3a-3b show a relationship between capacitance and rotation, according to one embodiment of the invention.

Referring to FIGS. 3a-3b, the relative angular position of the two discs can be deduced by first subtracting each pair of sinusoids that are 180 degrees out of phase and then taking the four quadrant inverse tangents of the quotient of the two differences. A constant scale factor and offset may need to be applied depending on the implementation of the design. The encoder is a mixed absolute and incremental measurement device. For tracking of large angular motions, the last angle measurement can be stored to provide the correct increment to the next step in angle. This also limits the maximum angular rotation rate of the sensor 100.

Figure 4C:
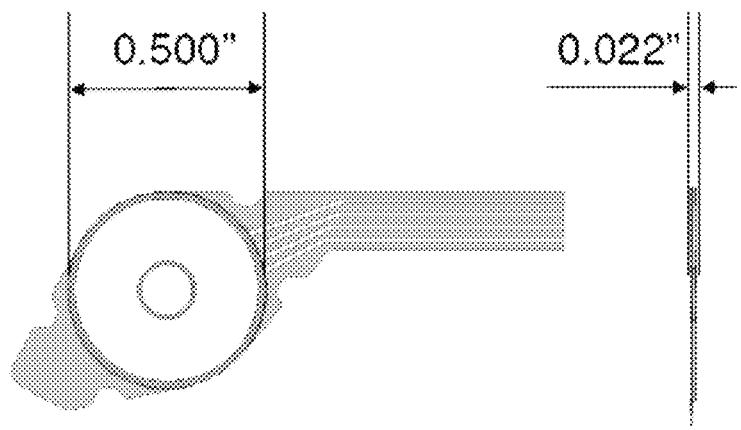
Figure 4C:
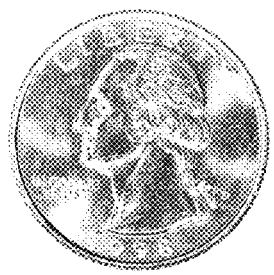
Figure 4C:
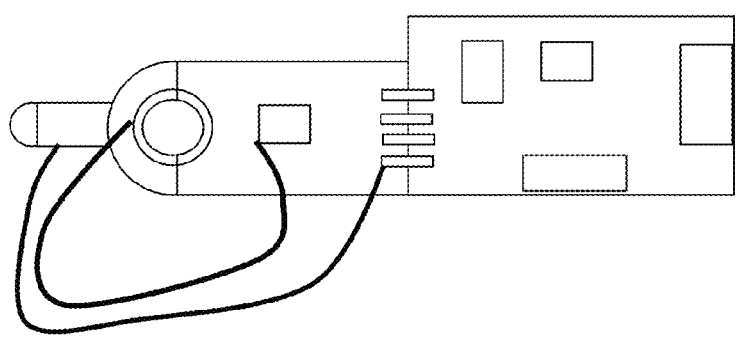

This sensor 100 is inherently flat and thin, which allows it to be packaged in tight places, as shown in FIGS. 4a-4c. It is much lower cost than competitive technologies. The resolution of the sensor 100 is significantly improved and fabrication costs are reduced. The precision required to adequately mount the sensor 100 and constraints on motion not in the sensed direction are significantly reduced for easier and more reliable use. The sensor 100 is non-contact, which also improves reliability and allows for zero friction operation.

The applications are wide and include almost any application where a compact, robust, alignment insensitive, high-resolution angular sensor is desired. Due to the low cost of fabrication, this invention is useful in cost sensitive markets such as toy manufacture or high volume production. Immediate applications are available in robotic joint position sensing.

The present approach provides several significant advantages. For example by implementing the four capacitive sensing channels 108, bias, capacitance and gain cancellation are made possible. This translates directly into improved angular resolution because the sensor 100 is inherently insensitive to humidity, temperature, the gap and material 112 between the two discs (102/106). Further, the sensor 100 is includes rotational symmetry so that if there is small lateral translation of the discs (102/106) or an angle is formed between the disc surfaces, these signals are cancelled. Combined with the differential cancellation of bias and gain terms, the sensor 100 is only sensitive to relative rotation of the discs (102/106) about their center axes. All other motions of the discs (102/106) produce very little signal thus easing requirements on mounting precision and improving noise performance. Other advantages include the sensor 100 is highly robust due to the non-contact layout, where there are no sliding contacts that can wear out. The electrical noise can be rejected by shielding conductors on the outside surfaces of both discs (102/106) that can be added as desired for the application.

Referring to FIGS. 4a-4c, the sensor 100 can be thin, such as out of two pieces of flex printed circuit material, so it can be mounted in places where there are tight space constraints. The diameter of the sensor can be a fraction of an inch with a tradeoff between size and resolution. A prototype sensor of 0.5" diameter is shown in FIG. 4c that exhibits noise-free resolution on the order of 12,000-36,000 counts per revolution, which is significantly higher than known in literature. A 1-inch diameter sensor 100 developed by the inventors provides 60,000-120,000 counts per revolution making it competitive with encoders marketed for their extreme resolution.

Numerous variations of the given examples are possible. The thickness and diameter of the sensor 100 can be adapted to the application. Larger diameter sensors 100 have higher resolution, while thicker sensors may be less expensive in low quantities. The scale can be hardwired to the capacitive sensing electronics or it can be capacitively coupled to them. The hardwired version provides the greatest noise immunity and highest resolution, but prevents infinite rotation of the scale due to the physical connection. If free rotation is required or wiring constraints demand it, the scale can be capacitively coupled to the electronics effectively as well. The resolution will decrease slightly due to the higher impedance path through a capacitive junction to the scale. Also, the number of times the four capacitive sensing pads are repeated on the sensor disc 102 changes the resolution/speed trade off.

Higher resolution can be provided with more repetitions of the sensing pads 104, but the maximum rotation rate decreases proportionately. However, the maximum rotation rate is limited by sensing electronics, not by the design of the sensor 100 itself.

Important advancements in the art include full area coverage of conductive materials (104/108) on both the sensor and scale discs (102/106), allowing maximum signal production for available sensing area. The use of four capacitive measurements to provide differential cancellation of offset bias and gain terms is an important advancement. The use of rotational symmetry, bias cancellation, and gain cancellation to reject noise caused by motion not in the direction of rotation the sensor 100 is designed to measure is new. The use of an active shield 110 to provide the maximum contrast between sensor pads 104 is capacitively coupled to different conductors on the scale disc 106. And, the use of the active shield 110 to protect all traces leading from the sensor disc 102 to the measurement electronics is an advantage.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example the invention could be produced with a low number of sensor pads to provide useful operation at high RPM such as in motor shaft encoding applications. Alternatively, the sensor could be designed with a maximum number of sensor pads as limited by the manufacturing process to provide an ultra-high resolution angular sensor that would be suitable for torsion measurements in a torsion sensor such as a torsion bar type sensor. The design presented can be customized to a wide variety of angular sensing scenarios by appropriately sizing the diameter, gap, and number of pads in the sensor.

All such variations are considered to be within the scope and spirit of the present invention as defined by the following claims and their legal equivalents.

What is claimed:

1. A rotary position sensor comprising:
   a. a sensing disc comprising N-fold rotation symmetry, wherein said sensing disc comprises capacitive sensing pads, wherein said capacitive sensing pads are arranged in an array pattern, wherein said array pattern comprises at least 4N-fold rotation symmetry, wherein N≥2;
   b. a scale disc disposed opposite said sensing disc, wherein said scale disc comprises a pattern of conductive pads, wherein said conductive pad comprises a sinusoidal-shape, wherein said pattern of sinusoidal-shaped conductive pads produce four sinusoidal capacitance waveforms in quadrature phase with said capacitive sensing pads as said sensing disc and said scale disc are rotated relative to one another to provide angular position information, wherein an overlapping area of said capacitive sensing pads changes in a sinusoidal pattern according to rotation.

2. The rotary position sensor of claim 1, wherein said conductive pads are electrically passive or electrically active.

3. The rotary position sensor of claim 1, wherein said conductive pads comprise a ground connection and an active shield connection, wherein said ground connection provides a relatively maximum capacitive coupling to said sensing disc, wherein and said active shield coupling comprises a relatively minimum capacitive coupling to said sensing disc.

4. The rotary position sensor of claim 3, wherein said connections comprise one of the following: i) a physical connection of said scale disc conductors to said ground and said active shield terminals of capacitive sensing electronics, ii) a capacitive coupling to provide free rotation of said scale disc, or i) and ii).

5. The rotary position sensor of claim 1, wherein a relative angular position of said sensing disc to said scale disc is deduced by subtracting each pair of said sinusoids that are 180 degrees out of phase and determining the four quadrant inverse tangents of a quotient of the two differences.

\* \* \* \* \*